US012572538B2

(12) United States Patent (10) Patent No.: US 12,572,538 B2
Ravindran et al. (45) Date of Patent: Mar. 10, 2026

(54) UNIFIED QUERY OPTIMIZATION FOR SCALE-OUT QUERY PROCESSING

(71) Applicant: Microsoft Technology Licensing, LLC, Redmond, WA (US)

(72) Inventors: Sharon Nirupa Ravindran, Woodinville, WA (US); Guoheng Chen, Orange, CA (US); Kabita Mahapatra, Redmond, WA (US); Cesar A. Galindo-Legaria, Redmond, WA (US); Milind Joshi, Seattle, WA (US); Beysim Sezgin, Redmond, WA (US); Ernesto Cervantes Juarez, Bellevue, WA (US); Esteban Eduardo Calvo Vargas, San Jose (CR); Nicolas Bruno, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/471,135

(22) Filed: Sep. 20, 2023

(65) Prior Publication Data

US 2024/0394254 A1 Nov. 28, 2024

Related U.S. Application Data

(60) Provisional application No. 63/504,199, filed on May 24, 2023.

(51) Int. Cl.
G06F 16/2453 (2019.01)
(52) U.S. Cl.
CPC .. G06F 16/24542 (2019.01); G06F 16/24532 (2019.01)
(58) Field of Classification Search
CPC ..................... G06F 16/24542; G06F 16/24532
See application file for complete search history.

(56) References Cited

U.S. PATENT DOCUMENTS 6,625,593 B1 * 9/2003 Leung ............... G06F 16/24532
7,984,043 B1 * 7/2011 Waas .................. G06F 16/8358
707/718

(Continued)

FOREIGN PATENT DOCUMENTS

WO WO-2013049715 A1 * 4/2013 ......... G06F 21/6263

OTHER PUBLICATIONS

International Search Report and Written Opinion received for PCT Application No. PCT/US2024/030147, Aug. 23, 2024, 13 pages.

(Continued)

*Primary Examiner* — Sherief Badawi
*Assistant Examiner* — Earl Levi Elias
(74) *Attorney, Agent, or Firm* — ArentFox Schiff LLP

(57) ABSTRACT

Example aspects include techniques for unified query optimization for scale-out query processing. These techniques may include receiving a query including one or more query operators, and determining, based on the one or more query operators, a query representation including one or more logical operators. In addition, the techniques may include generating, based on the query representation and metadata, a query plan including one or more physical operators implementing the one or more logical operators and a data movement operator corresponding to data movement to a plurality of nodes for parallel execution of the one or more physical operators over data. Further, the techniques may include selecting the query plan based on individual cost values of the one or more physical operators and the data movement operator, and executing, based on the selecting, the query plan to generate a query result.

19 Claims, 4 Drawing Sheets

(56)  References Cited

U.S. PATENT DOCUMENTS

| | | | |
|---|---|---|---|
| 2006/0218123 A1* | 9/2006 | Chowdhuri ....... | G06F 16/24532 |
| 2016/0246842 A1* | 8/2016 | Li ..................... | G06F 16/24542 |
| 2019/0392068 A1* | 12/2019 | Wen ................. | G06F 16/24545 |
| 2022/0237192 A1* | 7/2022 | Jiang .................. | G06F 16/2455 |

OTHER PUBLICATIONS

International Preliminary Report On Patentability received for PCT
Application No. PCT/US2024/030147, mailed on Dec. 4, 2025, 08
pages.

\* cited by examiner

100

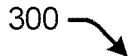

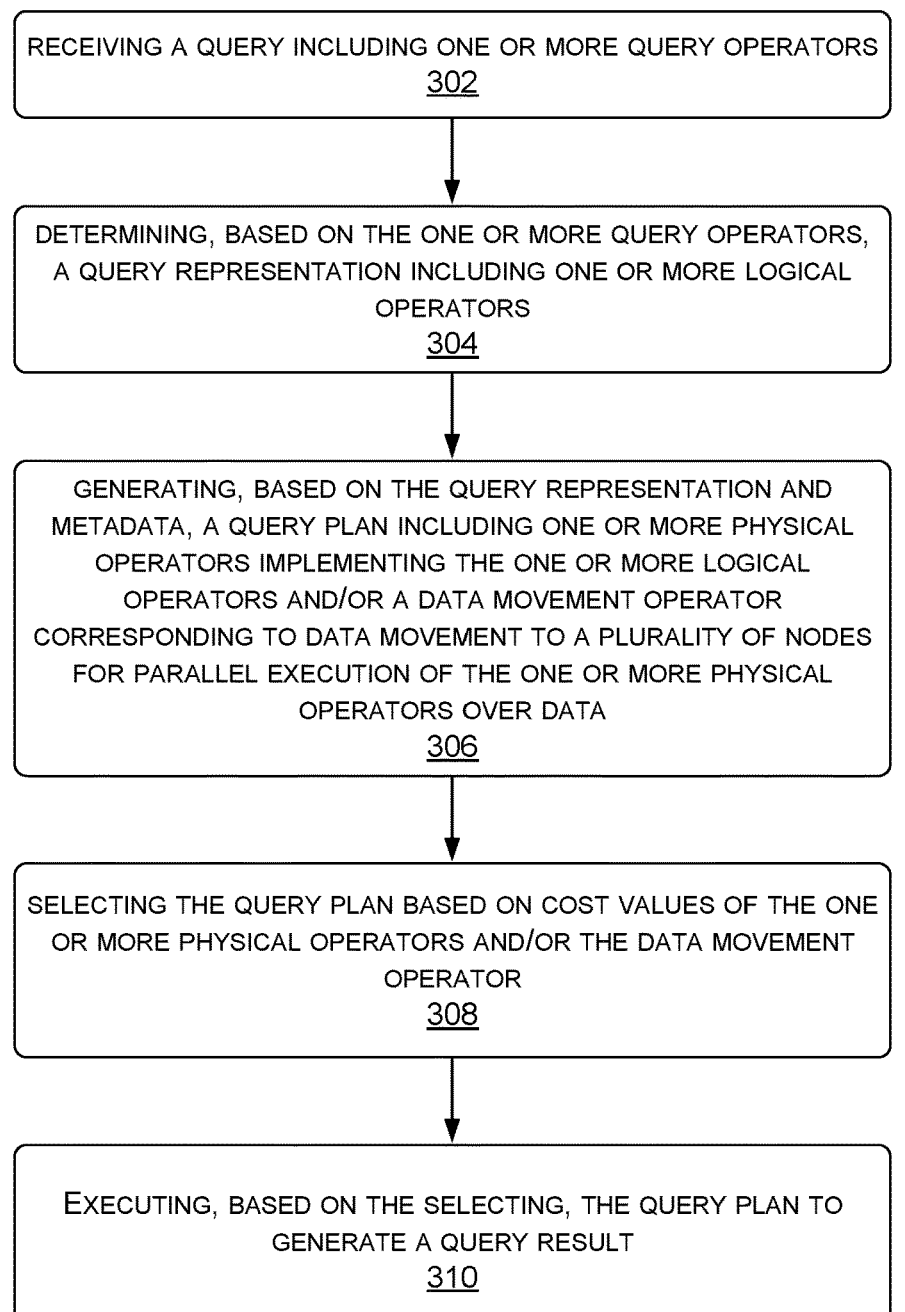

RECEIVING A QUERY INCLUDING ONE OR MORE QUERY OPERATORS
302

DETERMINING, BASED ON THE ONE OR MORE QUERY OPERATORS, A QUERY REPRESENTATION INCLUDING ONE OR MORE LOGICAL OPERATORS
304

GENERATING, BASED ON THE QUERY REPRESENTATION AND METADATA, A QUERY PLAN INCLUDING ONE OR MORE PHYSICAL OPERATORS IMPLEMENTING THE ONE OR MORE LOGICAL OPERATORS AND/OR A DATA MOVEMENT OPERATOR CORRESPONDING TO DATA MOVEMENT TO A PLURALITY OF NODES FOR PARALLEL EXECUTION OF THE ONE OR MORE PHYSICAL OPERATORS OVER DATA
306

SELECTING THE QUERY PLAN BASED ON COST VALUES OF THE ONE OR MORE PHYSICAL OPERATORS AND/OR THE DATA MOVEMENT OPERATOR
308

EXECUTING, BASED ON THE SELECTING, THE QUERY PLAN TO GENERATE A QUERY RESULT
310

FIG. 3

UNIFIED QUERY OPTIMIZATION FOR SCALE-OUT QUERY PROCESSING

CROSS-REFERENCE TO RELATED APPLICATION

This application claims priority to U.S. Application No. 63/504,199, entitled "UNIFIED QUERY OPTIMIZATION FOR SCALE-OUT QUERY PROCESSING," filed on May 24, 2023, the disclosure of which is incorporated by reference herein in its entirety.

BACKGROUND

Typically computer applications and systems incorporate a data layer for storing information and providing the information to users and/or services. For example, many applications include database management systems for data persistence. Query optimization is a standard component of database management systems because query optimization takes declarative queries written by users and produces efficient execution plans for those queries. Query optimizers typically focus on deciding an order of evaluation as well as the execution algorithms to use for physical operators. Many query optimizers consider a large number of candidate execution plans, and select one for execution based on a plurality of cost factors. Some database management systems employ scale-out query execution where data is moved across multiple nodes to execute a query in a distributed fashion. Data movement can be resource intensive and/or inefficient, and may require specific rules for correctness of query execution. However, standard query optimizers fail to account for the costs of data movement between a plurality of nodes, or even consider whether scale out execution over the plurality of nodes is cost efficient in comparison to single node execution.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In some aspects, the techniques described herein relate to a method including: receiving a query including one or more query operators; determining, based on the one or more query operators, a query representation including one or more logical operators; generating, based on the query representation and metadata, a query plan including one or more physical operators implementing the one or more logical operators and a data movement operator corresponding to data movement to a plurality of nodes for parallel execution of the one or more physical operators over data; selecting the query plan based on cost values of the one or more physical operators and/or the data movement operator; and executing, based on the selecting, the query plan to generate a query result.

In some aspects, the techniques described herein relate to a system including: a memory storing instructions thereon; and at least one processor coupled with the memory and configured by the instructions to: receive a query including one or more query operators; determine, based on the one or more query operators, a query representation including one or more logical operators; generate, based on the query representation and metadata, a query plan including one or more physical operators implementing the one or more logical operators and a data movement operator corresponding to data movement to a plurality of nodes for parallel execution of the one or more physical operators over data; select the query plan based on individual cost values of the one or more physical operators and the data movement operator; and execute the query plan to generate a query result.

In some aspects, the techniques described herein relate to a non-transitory computer-readable device having instructions thereon that, when executed by at least one computing device, causes the at least one computing device to perform operations including: receiving a query including one or more query operators; determining, based on the one or more query operators, a query representation including one or more logical operators; generating, based on the query representation and metadata, a query plan including one or more physical operators implementing the one or more logical operators and a data movement operator corresponding to data movement to a plurality of nodes for parallel execution of the one or more physical operators over data; selecting the query plan based on individual cost values of the one or more physical operators and the data movement operator; and executing, based on the selecting, the query plan to generate a query result.

Additional advantages and novel features relating to implementations of the present disclosure will be set forth in part in the description that follows, and in part will become more apparent to those skilled in the art upon examination of the following or upon learning by practice thereof.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

FIG. 3 is a flow diagram illustrating an example method for unified query optimization for scale-out query processing, in accordance with some aspects of the present disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes techniques for unified query optimization for scale-out query processing. Typically, query optimizers fail to factor data movement costs when evaluating query plans for scale-out execution, or evaluate data movement costs separately from relational operation costs. As a result, modern query optimizers suffer from inefficient techniques that fail to account for the resource costs (e.g., computational costs, bandwidth costs, speed costs) of data movement or improperly prioritize one of relational operations or data movement. In addition, modern query optimizers also fail to determine the cost benefits or drawbacks of scale-out query processing based on the attributes of the data that will be moved as a result of the distributed processing of a query.

Aspects of the present disclosure provide a query processing system that receives a query for execution, generates a query plan including physical operators and data movement operators for performing a query across distributed nodes, determines to implement the query plan based on the costs of the physical operators and data movement operators of the query plan, and executes the query in accordance with the physical operators and data movement operators of the query plan. Accordingly, query optimizer performance is improved by simultaneously evaluating relational and data movement costs in a unified query optimization process that ensures more accurate analysis of data movement costs.

Illustrative Environment

Figure 1:
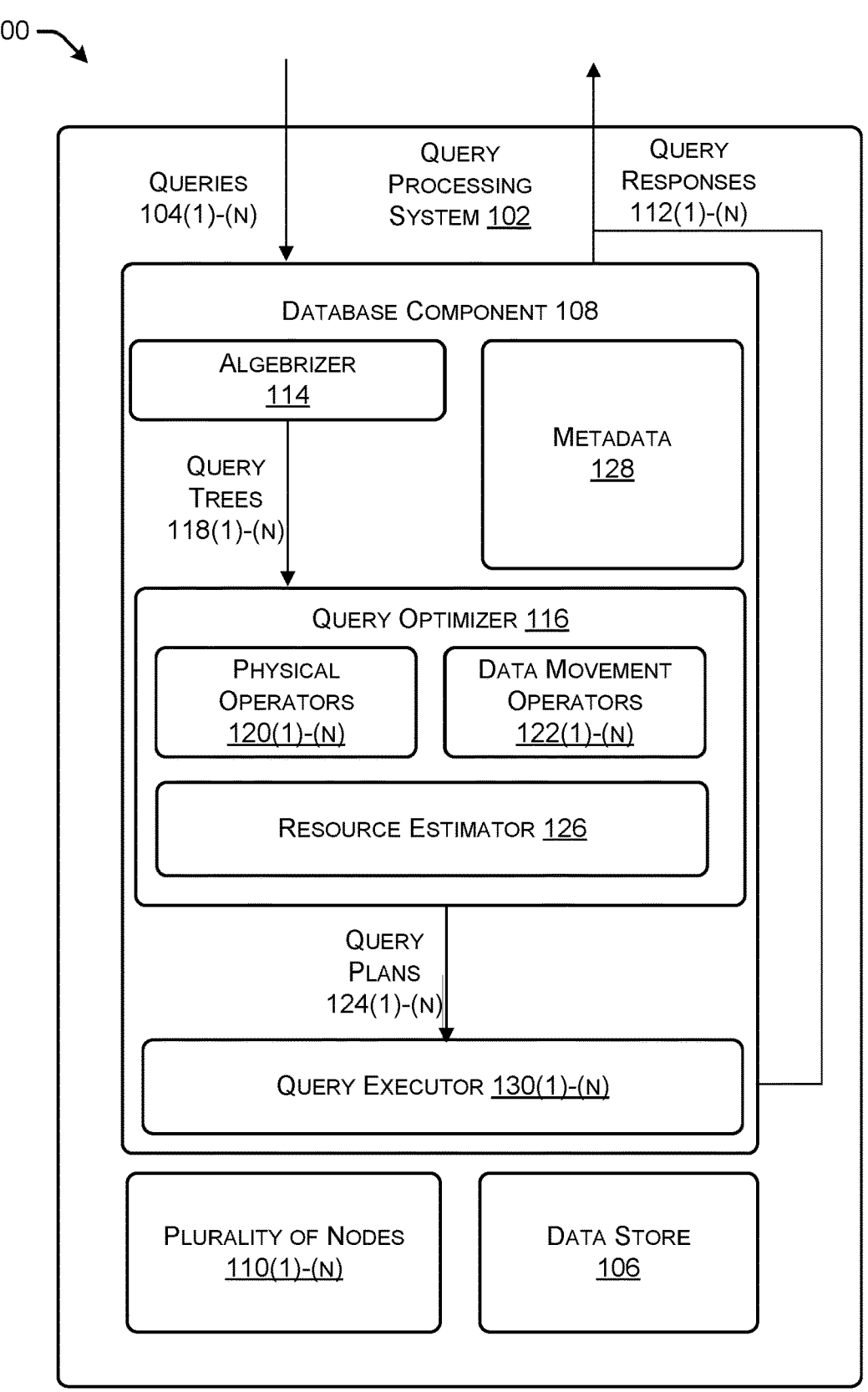
FIG. 1 illustrates an example architecture of a computing system implementing unified query optimization for scale-out query processing, in accordance with some aspects of the present disclosure.

FIG. 1 is a diagram showing an example of a data processing system 100, in accordance with some aspects of the present disclosure.

As illustrated in FIG. 1, the data processing system 100 may include a query processing system 102 configured to process queries 104(1)-(n) over a data store 106. The data processing system 100 may further include a database component 108 and plurality of nodes 110(1)-(n) (e.g., computing nodes).

In some aspects, the query processing system 102 may be a client device. Some examples of a client device include computing devices, servers, smartphone devices, Internet of Things (IoT) devices, drones, robots, process automation equipment, sensors, control devices, vehicles, transportation equipment, tactile interaction equipment, virtual and augmented reality (VR and AR) devices, industrial machines, virtual machines, etc. In some aspects, the query processing system 102 may be a cloud computing platform that provides other computing devices with distributed storage and access to software, services, files, and/or data via one or more network(s), e.g., cellular networks, wireless networks, local area networks (LANs), wide area networks (WANs), personal area networks (PANs), the Internet, or any other type of network configured to communicate information between computing devices. As an example, the data processing system 100 may be a provider of software as a service (SaaS), search engine as a service (SEaaS), database as a service (DaaS), storage as a service (STaaS), big data as a service (BDaaS) in a multi-tenancy environment via the Internet, and the query processing system 102 may be used to services queries 104(1)-(n) submitted to the data processing system 100.

The database component 108 may be configured to organize a collection of data on the data store 106. In some aspects, the data store 106 and database component 108 may reside on a single storage device or system or on multiple storage devices or systems such as available at one or more data centers. Further, the database component 108 may include various types of database services (e.g., relational, non-relational, structured query language (SQL), noSQL) for storing, querying, and updating data. As illustrated in FIG. 1, in some aspects, the database component 108 may receive the queries 104(1)-(n) and transmit corresponding query responses 112(1)-(n). Further, the database component 108 may organize data of the data store 106 for any of various types of data processing services (e.g., query processing to perform functions such as anomaly detection, machine learning, data lookup, or any other type of data processing operation).

As illustrated in FIG. 1, the database component 108 includes an algebrizer 114 and a query optimizer 116. The algebrizer 114 generates first query representations (e.g., query trees 118) based on the queries 104(1)-(n). For example, in some aspects, the algebrizer 114 parses a query 104 in a data manipulation (DML) syntax (e.g., SQL) to generate a query tree 118 that is manipulatable by the query optimizer 116. In some aspects, a "query tree" may refer to a tree representation of a query (e.g., a logical expression tree over a logical algebra). In some aspects, the query tree 118 is a tree of logical operators in which each tree node is a logical operator having zero or more logical operators as its inputs. Further, in some aspects, a query tree 118 is used to specify the order in which the logical operators are to be applied. In some aspects, a "logical operator" may refer to a relational algebra operator that may have a plurality of different candidate algorithms or implementations, e.g., scan or join.

As illustrated in FIG. 1, the query optimizer 116 includes physical operators 120(1)-(n) and data movement operators 122(1)-(n) that are employed to generate second representations (e.g., query plans 124) based on the first representations. The physical operators 120 represent specific algorithms that implement particular database operations. The data movement operators 122 represent specific algorithms that implement data movement operations to one or more of the plurality of nodes 110. Further, physical execution algorithms and/or data movement algorithms can be used to implement a logical operator of a query tree 118.

As described herein, in some aspects, the query processing system 102 improves query processing by partitioning data into smaller fragments and operating on those smaller fragments concurrently across the plurality of nodes 110. Further, the query optimizer 116 performs a cost-based process that selects a query plan 124 based on the cost of the physical operators 120 and the data movement operators 122 of the query plan 124. In particular, the query optimizer 116 compares the costs of implementing a logical operator of a query tree 118 and/or a query fragment including a plurality of logical operators of the query tree 118 on a single node 110 to scaling out implementation of the logical operator or the query fragment over a plurality of the nodes 110, and selects the query plan 124 including the most efficient implementation from a cost perspective.

Additionally, in some aspects, the query optimizer 116 includes a resource estimator 126 that estimates a projected resource utilization for implementing a logical operator of a query tree 118 and/or a query fragment including a plurality of logical operators of the query tree 118 based on metadata 128 corresponding to a query 104, and determines the number of nodes 110 that should be used to process the query 104 based on the projected resource utilization. In some instances, the projected resource utilization includes estimations of the number of nodes, an amount of memory, a number of cores, and an amount of disk storage that should be used to implement a logical operator or a query fragment. Some examples of metadata 128 include a size of one or more tables associated with the query 104 (e.g., the number of rows of the associated tables, the cardinality of associated tables, etc.), a statistical distribution of one or more columns of the one or more tables associated with the query 104, the types of data stored in the one or more tables associated with the query 104, and/or any other attribute associated with the one or more tables associated with the query 104.

As described above, the query optimizer 116 transforms a query tree 118 into a plurality of candidate query plans 124, and selects a query plan 124 that will be executed over the data store 106 by a query executor 130. In particular, the query optimizer 116 generates the candidate query plans 124 by replacing the logical operators in a query tree 118 with the physical operators 120 and/or data movement operators 122 to generate a plurality of query plans 124 as trees of different combinations of physical operators 120 and data movement operators 122. Further, each operator added to a query plan 124 has an associated cost. Alternatively, in some aspects, the query optimizer 116 may generate a query plan 124 by iterating/traversing through a query tree 118, identifying an operator corresponding to one or more logical operators of the query tree 118 based on the operator having the lowest cost among of a plurality of operators corresponding to the one or more logical operators, and adding the identifier operator to the query plan 124.

Additionally, the query optimizer 116 implements enforcer rules configured to insert both physical operators 120 and/or data movement operators 122 that enforce or guarantee desired physical or data distribution properties into the query plans 124. Further, the physical operators 120 and data movement operator 122 inserted by an enforcer rule are called enforcers. Some examples of enforcer rules for the physical operators include the sort enforcer transformation rule and the merge-join transformation rule. Some examples of data movement enforcers inserted into a query plan 124 include a shuffle enforcer (e.g., in response to a hash join or merge join operator), a broadcast enforcer (e.g., in response to a hash join or merge join operator), and a single node enforcer (e.g., in response to a scalar aggregate operator). Further, in some aspects, a shuffle enforcer or a broadcast enforcer is used to implement a data distribution property corresponding to movement of data to multiple nodes 110 (e.g., a particular partitioning or broadcasting of data to a plurality of nodes 110), and a single node enforcer is used to implement a data distribution property corresponding to non-movement of data or movement of data to a single node 110.

For example, if a query optimizer 116 receives a query tree 118 including a logical operator corresponding to a hash join or merge join between two tables, the query optimizer 116 generates a plurality of candidate query plans 124 each having a different combination of operators (i.e., physical operators 120 and/or data movement operators 122) and selects the query plan 124 from the plurality of candidate query plans 124 having the lowest cost. For example, the query optimizer 116 determines that the join can be implemented by partitioning the first table over a plurality of nodes 110 and broadcasting the second table to each of the plurality of nodes 110 in accordance with a first data movement rule, and generates a first query plan 124(1) including a broadcast operator based on the first data movement rule. Further, the query optimizer 116 determines that the join can be implemented by partitioning the second table over a plurality of nodes 110 and broadcasting the first table to each of the plurality of nodes 110 in accordance with a second data movement rule, and generates a second query plan 124(2) including a broadcast operator based on the second data movement rule. In addition, the query optimizer 116 determines that the join can be implemented by partitioning both tables over a plurality of nodes 110 in accordance with a third data movement rule, and generates a third query plan 124(3) including a shuffle operator based on the third data movement rule. Additionally, the query optimizer 116 determines that the join can be implemented on a single node 110, and generates a fourth query plan 124(4) without a data movement operator (or with a single node operator). Further, the query plans 124(1)-(4) may include other operators corresponding to other logical operators of the query tree 118. Once the query optimizer 116 has generated the query plans 124(1)-(4), the query optimizer 116 sums the costs of the operators of each query plan 124 to determine a total cost for each individual query plan 124, and selects the query plan 124 having the lowest cost.

In some aspects, the query optimizer 116 initially employs the resource estimator 126 to determine an estimated number of nodes 110 that should be used when considering a scale-out implementation of one or more logical operators of a query tree 118. For example, in some aspects, the resource estimator 126 determines the projected resource usage of the hash join or merge join between two tables, and compares the projected resource usage to one or more predefined thresholds to determine that three nodes 110(1)-(3) should be used by the query optimizer 116 when implementing a data movement operator for a logical operator within a candidate query plan 124 for the hash join or merge join. Consequently, the query optimizer 116 generates the first query plan 124(1) to broadcast the second table to each of the three nodes 110(1)-(3) in accordance with the first data movement rule and the projected resource usage, generates the second query plan 124(2) to broadcast the first table to each of the three nodes 110(1)-(3) in accordance with the second data movement rule and the projected resource usage, and generates the third query plan 124(3) to partition both tables over the three nodes 110(1)-(3) via a shuffle operator based on the third data movement rule and the projected resource usage. In some aspects, the resource estimator 126 determines individual projected resource usage values for different branches of a query tree 118. Additionally, or alternatively, in some aspects, the resource estimator 126 reuses the estimated number of nodes determined for a first logical operator for other logical operators within the same query tree 118, e.g., an adjacent logical operator.

Once the query optimizer 116 has selected a query plan 124, the query optimizer 116 provides the selected query plan 124 to the query executor 130. Further, the query executor 130 performs the operations defined within the query plan 124. In some aspects, the query executor 130 is a database engine configured to perform instructions over the data store 106 (e.g., database tables residing in the data store 106). Further, in some scale-out implementations, each node 110 includes a query executor 130 for performing aspects of the query plan 124 in parallel. For example, the shuffle operator within the query plan 124 would be implemented and the corresponding join would be executed over three nodes 110.

Figure 2:
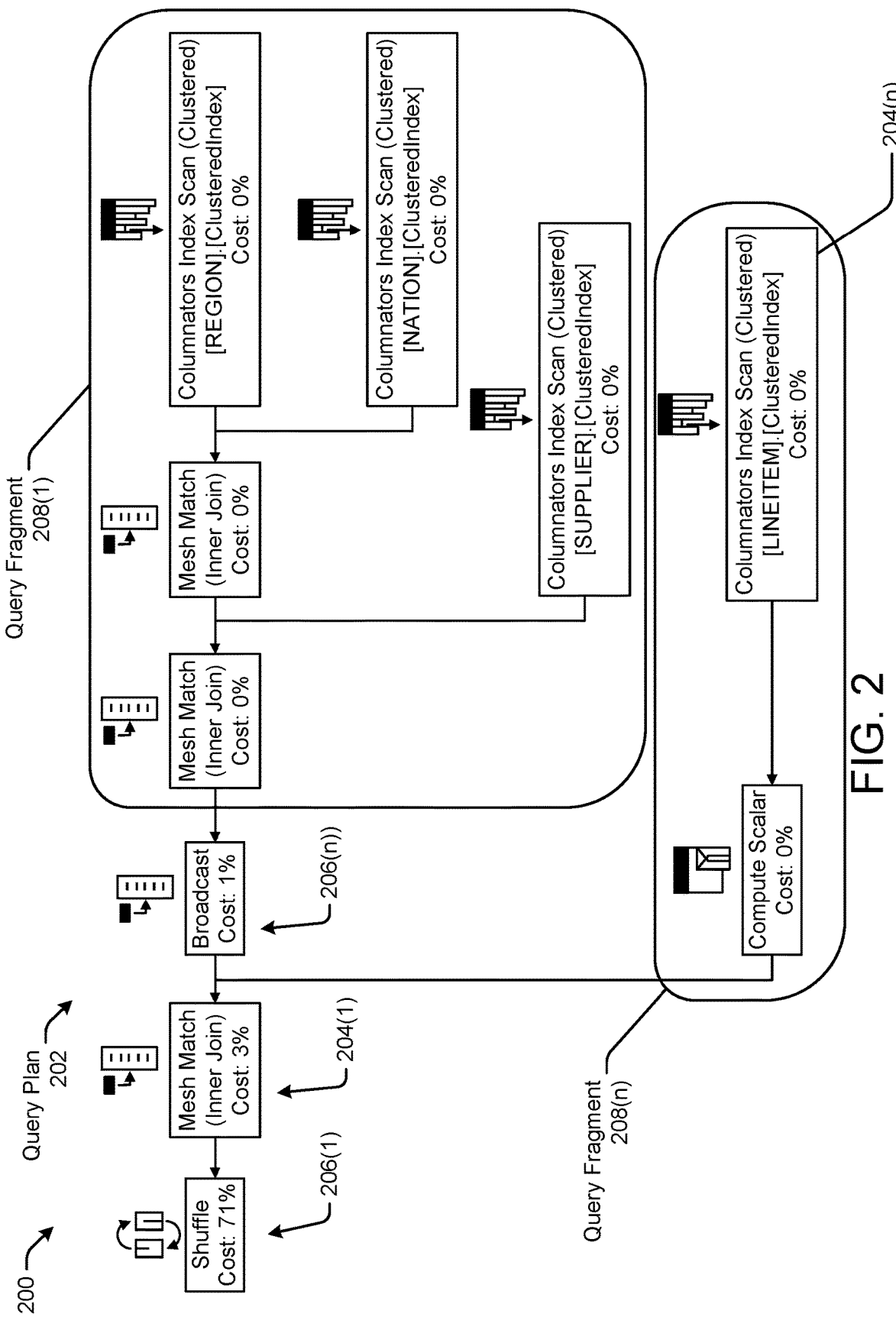
FIG. 2 is a diagram illustrating an example query plan generated via unified query optimization for scale-out query processing, in accordance with some aspects of the present disclosure.

FIG. 2 is a diagram showing an example of a query plan 200 (e.g., a query plan 124), in accordance with some aspects of the present disclosure. As illustrated in FIG. 2, the query plan includes a plurality of operators 202(1)-(n) each having a cost. Further, the operators 202(1)-(*n*) include physical operators 204(1)-(*n*) and data movement operators 206(1)-(*n*). In addition, in some aspects, one or more of the operators 202(1)-(*n*) form a query fragment 208.

Example Processes

The processes described in FIG. 3 below are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The operations described herein may, but need not, be implemented using the query processing system 102. By way of example and not limitation, the method 300 is described in the context of FIGS. 1, 2 and 4. For example, the operations may be performed by one or more of the query processing system 102, the query processing system 102, the database component 108, the plurality of nodes 110, the algebrizer 114, the query optimizer 116, the resource estimator 126, and the query executor 130.

FIG. 3 is a flow diagram illustrating an example method 300 for unified query optimization for scale-out query processing, in accordance with some aspects of the present disclosure.

At block 302, the method 300 may include receiving a query including one or more query operators. For example, the database component 108 may receive a query 104(1) including one or more query operators from a client application and/or device. In some aspects, the query 104(1) is a SQL query including one or more SQL commands.

Accordingly, the data processing system 100, the query processing system 102, the computing device 400, and/or the processor 402 executing the database component 108 may provide means for receiving a query including one or more query operators.

At block 304, the method 300 may include determining, based on the one or more query operators, a query representation including one or more logical operators. For example, the algebrizer 114 generates a query tree 118(1) for the query 104(1). Further, the query tree 118(1) includes one or more logical operators associated with the query operators of the query 104(1).

Accordingly, the data processing system 100, the query processing system 102, the computing device 400, and/or the processor 402 executing database component 108 or the algebrizer 114 may provide means for determining, based on the one or more query operators, a query representation including one or more logical operators.

At block 306, the method 300 may include generating, based on the query representation and metadata, a query plan including one or more physical operators implementing the one or more logical operators and a data movement operator corresponding to data movement to a plurality of nodes for parallel execution of the one or more physical operators over data. For example, the query optimizer 116 may generate a query plan 124(1) for the query 104(1). In particular, the query optimizer 116 generates the query plan 124 based on the costs of physical operators 120 and data movement operators 122 for implementing the logical operators of the query tree 118(1). For instance, for each logical operator and/or group of logical operators (i.e., query fragment) of the query tree 118(1), the query optimizer 116 determines one or more corresponding physical operators and/or data movement operators 122 having a cost meeting a predefined criteria, e.g., the lowest cost or a cost below a predefined threshold.

Accordingly, the data processing system 100, the query processing system 102, the computing device 400, and/or the processor 402 executing database component 108 or the query optimizer 116 may provide means for generating, based on the query representation and metadata, a query plan including one or more physical operators implementing the one or more logical operators and a data movement operator corresponding to data movement to a plurality of nodes for parallel execution of the one or more physical operators over data.

At block 308, the method 300 may include selecting the query plan based on cost values of the one or more physical operators and/or the data movement operator. For example, after generating a plurality of candidate query plans 124, the query optimizer 116 selects the query plan 124 having the lowest cost for execution by the query executor 130.

Accordingly, the data processing system 100, the query processing system 102, the computing device 400, and/or the processor 402 executing database component 108 or the query optimizer 116 may provide means for selecting the query plan based on cost values of the one or more physical operators and/or the data movement operator.

At block 310, the method 300 may include executing, based on the selecting, the query plan to generate a query result. For example, the query executor 130 receives the query plan 124(1) from the query optimizer 116 and executes the query plan 124(1) over the data store 106 to determine the query response 112(1) to the query 104(1). In some aspects, one or more operations of the query plan 124(1) are performed by parallelized query executors 130 on a plurality of nodes 110.

Accordingly, the data processing system 100, the query processing system 102, the computing device 400, and/or the processor 402 executing the query executor 130 may provide means for executing, based on the selecting, the query plan to generate a query result.

In some aspects, the method 300 further includes wherein generating the query plan includes generating the query plan via a query optimizer.

In some aspects, the method 300 further includes wherein generating the query plan includes: identifying a logical operation associated with the parallel execution of the one or more physical operators over the data; and adding, to the query plan, the data movement operator corresponding to movement of the data. Accordingly, the data processing system 100, the query processing system 102, the computing device 400, and/or the processor 402 executing database component 108 or the query optimizer 116 may provide means for identifying a logical operation associated with the parallel execution of the one or more physical operators over the data; and adding, to the query plan, the data movement operator corresponding to movement of the data.

In some aspects, the method 300 further includes wherein generating the query plan includes: estimating a projected resource utilization of the one or more logical operators based on the metadata; determining a number of the plurality of nodes to utilize for scale out processing based on the projected resource utilization; and adding, to the query plan, the data movement operator corresponding to movement of the data to the amount of nodes. Accordingly, the data processing system 100, the query processing system 102, the computing device 400, and/or the processor 402 executing the resource estimator 126 may provide means for estimating a projected resource utilization of the one or more logical operators based on the metadata; determining a number of the plurality of nodes to utilize for scale out processing based on the projected resource utilization; and adding, to the query plan, the data movement operator corresponding to movement of the data to the amount of nodes.

In some aspects, the method 300 further includes wherein generating the query plan includes: estimating a projected resource utilization of the one or more logical operators based on the metadata; determining that projected resource utilization is less than a predefined threshold associated with the parallel execution of the one or more physical operators over the data; and adding, to the query plan, the one or more physical operators without the data movement operator corresponding to movement of the data. Accordingly, the data processing system 100, the query processing system 102, the computing device 400, and/or the processor 402 executing the resource estimator 126 may provide means for estimating a projected resource utilization of the one or more logical operators based on the metadata; determining that projected resource utilization is less than a predefined threshold associated with the parallel execution of the one or more physical operators over the data; and adding, to the query plan, the one or more physical operators without the data movement operator corresponding to movement of the data.

In some aspects, the method 300 further includes wherein the data movement operator includes a shuffle enforcer for partitioning data across the plurality of nodes. In some aspects, the method 300 further includes wherein the data movement operator includes a broadcast enforcer for broadcasting data to each of the plurality of nodes. In some aspects, the method 300 further includes wherein the data movement operator includes a single node enforcer for performing the one or more physical operators over the data on a node of the plurality of nodes.

In some aspects, the method 300 further includes wherein the query plan is a first query plan, and selecting the first query plan, includes: calculating a first total cost of the query plan based on individual cost values of the one or more physical operators and the data movement operator; and selecting the first query plan based on first total cost being less than a second total cost of a second query plan.

In some aspects, the method 300 further includes wherein the one or more query operators includes a structured query language operator.

In some aspects, the method 300 further includes wherein the metadata includes a size of one or more tables associated with the query, a statistical distribution of one or more columns of the one or more tables associated with the query, types of data stored in the one or more tables associated with the query, and/or one or more attributes associated with the one or more tables associated with the query.

While the operations are described as being implemented by one or more computing devices, in other examples various systems of computing devices may be employed. For instance, a system of multiple devices may be used to perform any of the operations noted above in conjunction with each other.

Illustrative Computing Device

Figure 4:
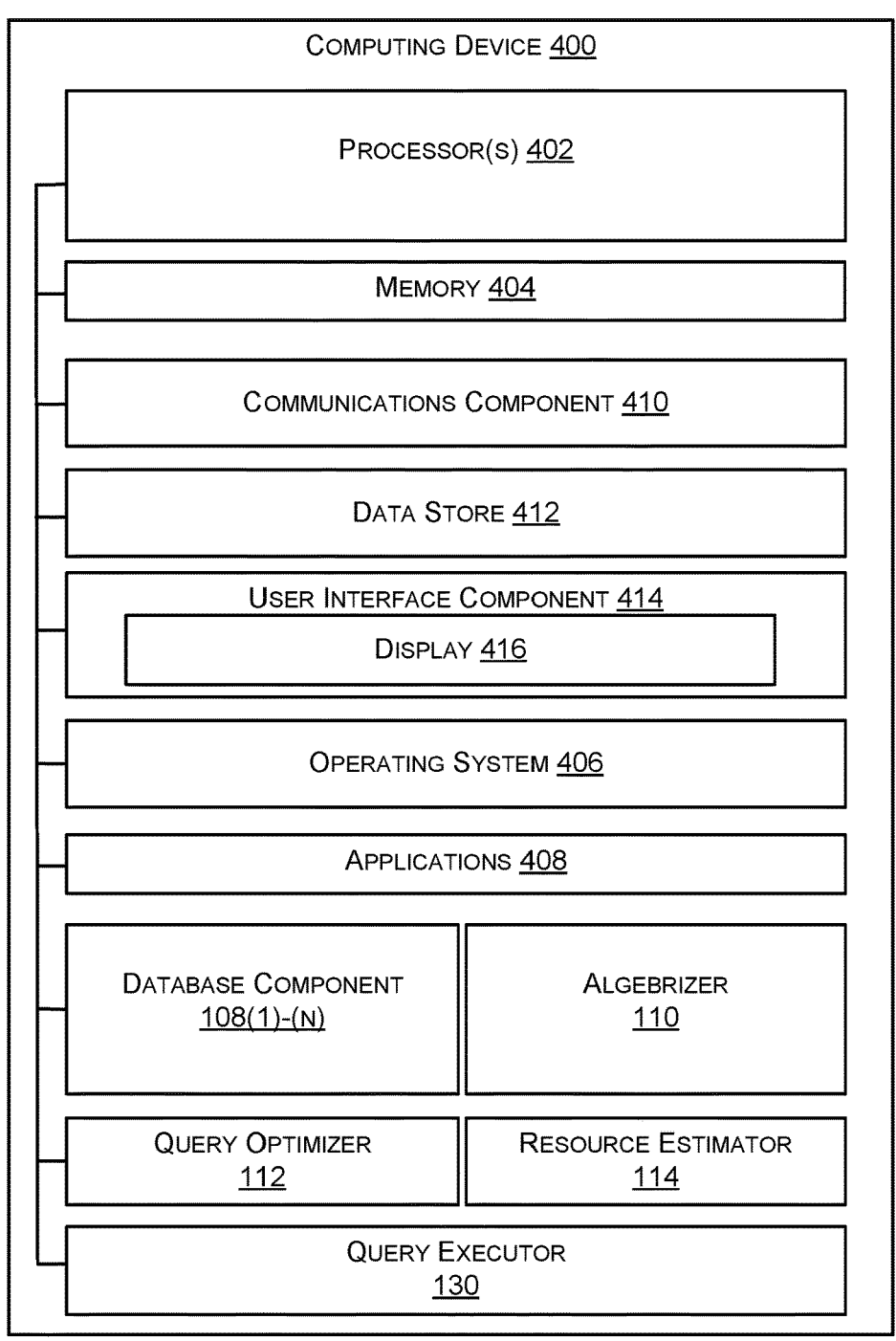
FIG. 4 is a block diagram illustrating an example of a hardware implementation for a computing device(s), in accordance with some aspects of the present disclosure.

Referring now to FIG. 4, an example of a computing device(s) 400 (e.g., query processing system 102). In one example, the computing device(s) 400 includes the processor 402 for carrying out processing functions associated with one or more of components and functions described herein. The processor 402 can include a single or multiple set of processors or multi-core processors. Moreover, the processor 402 may be implemented as an integrated processing system and/or a distributed processing system. In an example, the processor 402 includes, but is not limited to, any processor specially programmed as described herein, including a controller, microcontroller, a computer processing unit (CPU), a graphics processing unit (GPU), an application specific integrated circuit (ASIC), a field programmable gate array (FPGA), a system on chip (SoC), or other programmable logic or state machine. Further, the processor 402 may include other processing components such as one or more arithmetic logic units (ALUs), registers, or control units.

In an example, the computing device 400 also includes memory 404 for storing instructions executable by the processor 402 for carrying out the functions described herein. The memory 404 may be configured for storing data and/or computer-executable instructions defining and/or associated with the query processing system 102, the queries 104(1)-(n), the data store 106, the database component 108, the plurality of nodes 110, the query responses 112(1)-(n), the algebrizer 114, the query optimizer 116, the query trees 118(1)-(n), the physical operators 120(1)-(n), the movement data operators 122(1)-(n), the query plans 124(1)-(n), the resource estimator 126, the metadata 128, and the query executor 130, and the processor 402 may execute the query processing system 102, the database component 108, the plurality of nodes 110, the algebrizer 114, the query optimizer 116, the resource estimator 126 and the query executor 130. An example of memory 404 may include, but is not limited to, a type of memory usable by a computer, such as random access memory (RAM), read only memory (ROM), tapes, magnetic discs, optical discs, volatile memory, non-volatile memory, and any combination thereof. In an example, the memory 404 may store local versions of applications being executed by processor 402.

The example computing device 400 may include a communications component 410 that provides for establishing and maintaining communications with one or more parties utilizing hardware, software, and services as described herein. The communications component 410 may carry communications between components on the computing device 400, as well as between the computing device 400 and external devices, such as devices located across a communications network and/or devices serially or locally connected to the computing device 400. For example, the communications component 410 may include one or more buses, and may further include transmit chain components and receive chain components associated with a transmitter and receiver, respectively, operable for interfacing with external devices. In an implementation, for example, the communications component 410 may include a connection to communicatively couple the client devices 104(1)-(N) to the processor 402.

The example computing device 400 may include a data store 412, which may be any suitable combination of hardware and/or software, that provides for mass storage of information, databases, and programs employed in connection with implementations described herein. For example, the data store 412 may be a data repository for the operating system 406 and/or the applications 408.

The example computing device 400 may include a user interface component 414 operable to receive inputs from a user of the computing device 400 and further operable to generate outputs for presentation to the user. The user interface component 414 may include one or more input devices, including but not limited to a keyboard, a number pad, a mouse, a touch-sensitive display (e.g., display 416), a digitizer, a navigation key, a function key, a microphone, a voice recognition component, any other mechanism capable of receiving an input from a user, or any combination thereof. Further, the user interface component 414 may include one or more output devices, including but not limited to a display (e.g., display 416), a speaker, a haptic feedback mechanism, a printer, any other mechanism capable of presenting an output to a user, or any combination thereof.

In an implementation, the user interface component 414 may transmit and/or receive messages corresponding to the operation of the operating system 406 and/or the applications 408. In addition, the processor 402 executes the operating system 406 and/or the applications 408, and the memory 404 or the data store 412 may store them.

Further, one or more of the subcomponents of the query processing system 102, the database component 108, the algebrizer 114, the query optimizer 116, the resource estimator 126 and the query executor 130, may be implemented in one or more of the processor 402, the applications 408, the operating system 406, and/or the user interface component 414 such that the subcomponents of the query processing system 102, the database component 108, the algebrizer 114, the query optimizer 116, the resource estimator 126 and the query executor 130, are spread out between the components/subcomponents of the computing device 400.

Example Clauses

Clause 1. A method comprising: receiving a query including one or more query operators; determining, based on the one or more query operators, a query representation including one or more logical operators; generating, based on the query representation and metadata, a query plan including one or more physical operators implementing the one or more logical operators and/or a data movement operator corresponding to data movement to a plurality of nodes for parallel execution of the one or more physical operators over data; selecting the query plan based on cost values of the one or more physical operators and/or the data movement operator; and executing, based on the selecting, the query plan to generate a query result.

Clause 2. The method of clause 1, wherein generating the query plan comprises generating the query plan via a query optimizer.

Clause 3. The method of clause 1, wherein generating the query plan comprises: identifying a logical operation associated with the parallel execution of the one or more physical operators over the data; and adding, to the query plan, the data movement operator corresponding to movement of the data.

Clause 4. The method of clause 1, wherein generating the query plan comprises: estimating a projected resource utilization of the one or more logical operators based on the metadata; determining a number of the plurality of nodes to utilize for scale out processing based on the projected resource utilization; and adding, to the query plan, the data movement operator corresponding to movement of the data to the number of nodes.

Clause 5. The method of clause 1, wherein generating the query plan comprises: estimating a projected resource utilization of the one or more logical operators based on the metadata; determining that projected resource utilization is less than a predefined threshold associated with the parallel execution of the one or more physical operators over the data; and adding, to the query plan, the one or more physical operators without the data movement operator corresponding to movement of the data.

Clause 6. The method of clause 1, wherein the data movement operator includes a shuffle enforcer for partitioning data across the plurality of nodes.

Clause 7. The method of clause 1, wherein the data movement operator includes a broadcast enforcer for broadcasting data to each of the plurality of nodes.

Clause 8. The method of clause 1, wherein the data movement operator includes a single node enforcer for performing the one or more physical operators over the data on a node of the plurality of nodes.

Clause 9. The method of clause 1, wherein the query plan is a first query plan, and selecting the first query plan, comprises: calculating a first total cost of the query plan based on individual cost values of the one or more physical operators and the data movement operator; and selecting the first query plan based on first total cost being less than a second total cost of a second query plan.

Clause 10. The method of clause 1, wherein the one or more query operators includes a structured query language operator.

Clause 11. The method of clause 1, wherein the metadata includes a size of one or more tables associated with the query, a statistical distribution of one or more columns of the one or more tables associated with the query, types of data stored in the one or more tables associated with the query, and/or one or more attributes associated with the one or more tables associated with the query.

Clause 12. A system comprising: a memory storing instructions thereon; and at least one processor coupled with the memory and configured by the instructions to: receive a query including one or more query operators; determine, based on the one or more query operators, a query representation including one or more logical operators; generate, based on the query representation and metadata, a query plan including one or more physical operators implementing the one or more logical operators and a data movement operator corresponding to data movement to a plurality of nodes for parallel execution of the one or more physical operators over data; select the query plan based on cost values of the one or more physical operators and/or the data movement operator; and execute the query plan to generate a query result.

Clause 13. The system of clause 12, wherein to generate the query plan, the processor is further configured to generate the query plan via a query optimizer.

Clause 14. The system of clause 12, wherein to generate the query plan, the processor is further configured to: identify a logical operation associated with the parallel execution of the one or more physical operators over the data; and add, to the query plan, the data movement operator corresponding to movement of the data.

Clause 15. The system of clause 12, wherein to generate the query plan, the processor is further configured to: estimate a projected resource utilization of the one or more logical operators based on the metadata; determine a number of the plurality of nodes to utilize for scale out processing based on the projected resource utilization; and add, to the query plan, the data movement operator corresponding to movement of the data to the number of nodes.

Clause 15. The system of clause 12, wherein to generate the query plan, the processor is further configured to: estimate a projected resource utilization of the one or more logical operators based on the metadata; determine that projected resource utilization is less than a predefined threshold associated with the parallel execution of the one or more physical operators over the data; and add, to the query plan, the one or more physical operators without the data movement operator corresponding to movement of the data.

Clause 16. The system of clause 12, wherein the data movement operator includes a shuffle enforcer for partitioning data across the plurality of nodes.

Clause 17. The system of clause 12, wherein the data movement operator includes a broadcast enforcer for broadcasting data to each of the plurality of nodes.

Clause 18. The system of clause 12, wherein the data movement operator includes a single node enforcer for performing the one or more physical operators over the data on a node of the plurality of nodes.

Clause 19. The system of clause 12, wherein the query plan is a first query plan, and to select the first query plan, the processor is further configured to: calculate a first total cost of the query plan based on individual cost values of the one or more physical operators and the data movement operator; and select the first query plan based on first total cost being less than a second total cost of a second query plan.

Clause 20. A non-transitory computer-readable device having instructions thereon that, when executed by at least one computing device, causes the at least one computing device to perform operations comprising: receiving a query including one or more query operators; determining, based on the one or more query operators, a query representation including one or more logical operators; generating, based on the query representation and metadata, a query plan including one or more physical operators implementing the one or more logical operators and a data movement operator corresponding to data movement to a plurality of nodes for parallel execution of the one or more physical operators over data; selecting the query plan based on cost values of the one or more physical operators and/or the data movement operator; and executing, based on the selecting, the query plan to generate a query result.

Conclusion

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media. Non-transitory computer-readable media excludes transitory signals.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

In closing, although the various embodiments have been described in language specific to structural features and/or methodological acts, it is to be understood that the subject matter defined in the appended representations is not necessary limited to the specific features or acts described. Rather, the specific features and acts are disclosed as example forms of implementing the claimed subject matter.

What is claimed is:

1. A method comprising:

receiving, from a client application, a query for executing by a database management system, wherein the query includes one or more query operators;

determining, based on the one or more query operators, a query representation including one or more logical operators;

generating, based on the query representation and metadata, multiple query plans, wherein each query plan of the multiple query plans includes one or more physical operators implementing the one or more logical operators and one or more data movement operators corresponding to data movement to a plurality of nodes for parallel execution of the one or more physical operators over data, wherein generating the multiple query plans includes:

estimating, for each query plan of the multiple query plans and based on the metadata, projected resource utilization of the one or more logical operators; and determining, for each query plan of the multiple query plans and based on the projected resource utilization, a number nodes to utilize for scale out processing, wherein the plurality of nodes correspond to the number of nodes; and adding, to each query plan of the multiple query plans and based on the projected resource utilization, the one or more data movement operators for moving the data among the plurality of nodes, wherein the metadata includes one or more of a size of one or more tables associated with the query, a statistical distribution of one or more columns of the one or more tables associated with the query, types of data stored in the one or more tables associated with the query, and one or more attributes associated with the one or more tables associated with the query, and wherein a different number of nodes are determined for at least two query plans of the multiple query plans;

summing, for each query plan in the multiple query plans, cost values of the one or more physical operators and the one or more data movement operators to determine, for each query plan, an associated total cost;

selecting a query plan from the multiple query plans based on the associated total cost of the query plan; and executing, based on the selecting, the query plan by the database management system and over a data store to generate a query result.

2. The method of claim 1, wherein generating the query plan comprises generating the query plan via a query optimizer.

3. The method of claim 1, wherein generating the query plan comprises:

identifying a logical operation associated with the parallel execution of the one or more physical operators over the data; and adding, to the query plan, the one or more data movement operators corresponding to movement of the data.

4. The method of claim 1, wherein generating the query plan comprises:

estimating a projected resource utilization of the one or more logical operators based on the metadata;

determining a number of the plurality of nodes to utilize for scale out processing based on the projected resource utilization; and adding, to the query plan, the one or more data movement operators corresponding to movement of the data to the number of the plurality of nodes.

5. The method of claim 1, wherein generating the query plan comprises:

estimating a projected resource utilization of the one or more logical operators based on the metadata;

determining that projected resource utilization is less than a predefined threshold associated with the parallel execution of the one or more physical operators over the data; and adding, to the query plan, the one or more physical operators without the one or more data movement operators corresponding to movement of the data.

6. The method of claim 1, wherein the one or more data movement operators include a shuffle enforcer for partitioning data across the plurality of nodes.

7. The method of claim 1, wherein the one or more data movement operators include a broadcast enforcer for broadcasting data to each of the plurality of nodes.

8. The method of claim 1, wherein the one or more data movement operators include a single node enforcer for performing the one or more physical operators over the data on a node of the plurality of nodes.

9. The method of claim 1, wherein selecting the query plan, comprises:

calculating a first total cost of the query plan based on individual cost values of the one or more physical operators and the one or more data movement operators; and selecting the query plan from the multiple query plans based on the first total cost being less than a second total cost of at least another one of the multiple query plans.

10. The method of claim 1, wherein the one or more query operators includes a structured query language operator.

11. A system comprising:

a memory storing instructions thereon; and at least one processor coupled with the memory and configured by the instructions to:

receive, from a client application, a query for executing by a database management system, wherein the query includes one or more query operators;

determine, based on the one or more query operators, a query representation including one or more logical operators;

generate, based on the query representation and metadata, multiple query plans, wherein each query plan of the multiple query plans includes one or more physical operators implementing the one or more logical operators and one or more data movement operators corresponding to data movement to a plurality of nodes for parallel execution of the one or more physical operators over data, including:

estimating, for each query plan of the multiple query plans and based on the metadata, projected resource utilization of the one or more logical operators;

determining, for each query plan of the multiple query plans and based on the projected resource utilization, a number nodes to utilize for scale out processing, wherein the plurality of nodes correspond to the number of nodes; and adding, to each query plan of the multiple query plans and based on the projected resource utilization, the one or more data movement operators for moving the data among the plurality of nodes, wherein the metadata includes one or more of a size of one or more tables associated with the query, a statistical distribution of one or more columns of the one or more tables associated with the query, types of data stored in the one or more tables associated with the query, and er one or more attributes associated with the one or more tables associated with the query, and wherein a different number of nodes are determined for at least two query plans of the multiple query plans;

sum, for each query plan in the multiple query plans, cost values of the one or more physical operators and the one or more data movement operators to determine, for each query plan, an associated total cost;

select a query plan from the multiple query plans based on the associated total cost of the query plan; and execute the query plan by the database management system and over a data store to generate a query result.

12. The system of claim 11, wherein to generate the query plan, the at least one processor is further configured to generate the query plan via a query optimizer.

13. The system of claim 11, wherein to generate the query plan, the at least one processor is further configured to:

identify a logical operation associated with the parallel execution of the one or more physical operators over the data; and add, to the query plan, the one or more data movement operators corresponding to movement of the data.

14. The system of claim 11, wherein to generate the query plan, the at least one processor is further configured to:

estimate a projected resource utilization of the one or more logical operators based on the metadata;

determine a number of the plurality of nodes to utilize for scale out processing based on the projected resource utilization; and add, to the query plan, the one or more data movement operators corresponding to movement of the data to the number of the plurality of nodes.

15. The system of claim 11, wherein the one or more data movement operators include a shuffle enforcer for partitioning data across the plurality of nodes.

16. The system of claim 11, wherein the one or more data movement operators include a broadcast enforcer for broadcasting data to each of the plurality of nodes.

17. The system of claim 11, wherein the one or more data movement operators include a single node enforcer for performing the one or more physical operators over the data on a node of the plurality of nodes.

18. The system of claim 11, wherein to select the query plan, the at least one processor is further configured to:

calculate a first total cost of the query plan based on individual cost values of the one or more physical operators and the one or more data movement operators; and select the query plan from the multiple query plans based on the first total cost being less than a second total cost of at least another one of the multiple query plans.

19. A non-transitory computer-readable device having instructions thereon that, when executed by at least one computing device, causes the at least one computing device to perform operations comprising:

receiving, from a client application, a query for executing by a database management system, wherein the query includes one or more query operators;

determining, based on the one or more query operators, a query representation including one or more logical operators;

generating, based on the query representation and metadata, multiple query plans, wherein each query plan of the multiple query plans includes one or more physical operators implementing the one or more logical operators and one or more data movement operators corresponding to data movement to a plurality of nodes for parallel execution of the one or more physical operators over data, wherein generating the multiple query plans includes:

estimating, for each query plan of the multiple query plans and based on the metadata, projected resource utilization of the one or more logical operators;

determining, for each query plan of the multiple query plans and based on the projected resource utilization, a number nodes to utilize for scale out processing, wherein the plurality of nodes correspond to the number of nodes; and adding, to each query plan of the multiple query plans and based on the projected resource utilization, the one or more data movement operators for moving the data among the plurality of nodes, wherein the metadata includes one or more of a size of one or more tables associated with the query, a statistical distribution of one or more columns of the one or more tables associated with the query, types of data stored in the one or more tables associated with the query, and one or more attributes associated with the one or more tables associated with the query, and wherein a different number of nodes are determined for at least two query plans of the multiple query plans;

summing, for each query plan in the multiple query plans, cost values of the one or more physical operators and the one or more data movement operators to determine, for each query plan, an associated total cost;

selecting a query plan from the multiple query plans based on the associated total cost of the query plan; and executing, based on the selecting, the query plan by the database management system and over a data store to generate a query result.

* * * * *